United States Patent
Teraoka et al.

(10) Patent No.: US 6,837,821 B2
(45) Date of Patent: Jan. 4, 2005

(54) DIFFERENTIAL

(75) Inventors: Masao Teraoka, Tochigi (JP); Tatsuhiro Tomari, Utsunomiya (JP); Akihiro Iwazaki, Utsunomiya (JP); Koji Matsubara, Utsunomiya (JP); Yutaka Tashiro, Utsunomiya (JP)

(73) Assignees: Tochigi Fuji Sangyo Kabushiki Kaisha, Tochigi (JP); Honda Giken Kogyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/437,215

(22) Filed: May 13, 2003

(65) Prior Publication Data

US 2003/0232683 A1 Dec. 18, 2003

(30) Foreign Application Priority Data

May 16, 2002 (JP) ...................................... P2002-141342

(51) Int. Cl.[7] .............................................. F16H 48/20
(52) U.S. Cl. ..................... 475/231; 475/230; 475/233; 475/234; 475/235; 475/237; 475/238; 74/640; 192/34; 192/35; 192/70.3; 192/84.7; 192/99 A
(58) Field of Search ............................... 475/230, 231, 475/233, 234, 235, 237, 238; 74/640; 192/34, 35, 70.3, 84.7, 99 A (56) References Cited

U.S. PATENT DOCUMENTS

| | | | | |
|---|---|---|---|---|
| 5,030,181 A | * | 7/1991 | Keller | 475/150 |
| 5,125,876 A | * | 6/1992 | Hirota | 475/231 |
| 5,350,340 A | * | 9/1994 | Paul et al. | 475/237 |
| 6,290,623 B1 | * | 9/2001 | Morse | 475/231 |
| 6,561,939 B1 | * | 5/2003 | Knapke | 475/150 |
| 2003/0054914 A1 | * | 3/2003 | Tomari et al. | 475/231 |

FOREIGN PATENT DOCUMENTS

| | | | | |
|---|---|---|---|---|
| EP | 189556 A1 | * | 8/1986 | ........... F16H/1/445 |
| JP | 3-33939 | | 5/1991 | |

* cited by examiner

*Primary Examiner*—Saul Rodriguez
*Assistant Examiner*—David D. Le
(74) *Attorney, Agent, or Firm*—Morrison & Foerster LLP (57) ABSTRACT

The differential includes a differential casing configured to be rotatably driven by a motor under a driving force. The differential includes a differential mechanism which includes a pair of first and second side-gears for distributing a torque of the differential casing to first and second output shafts. The differential includes a frictional clutch for interconnecting the first and second output shafts. The frictional clutch includes first and second power-transmitting members connected to first and second output shafts respectively and first and second clutch plates. The first and second clutch plates are connected to the first and second power-transmitting members respectively. The differential includes an actuator for operating the frictional clutch. One output shaft of the first and second output shafts is axially displacable by the actuator under an engagement force to engage the frictional clutch.

8 Claims, 6 Drawing Sheets

DIFFERENTIAL

BACKGROUND OF THE INVENTION

1. Field of the Invention

The present invention relates to a differential adapted for a vehicle.

2. Description of Relevant Art

The Examined Patent Application Publication of NO. Hei3-33939 describes a differential.

An engine rotates a differential casing under a driving force. A bevel-gear type differential mechanism includes output side-gears, which distribute a driving force to left and right wheels through respective axles.

The side-gears and the differential casing have respective multiplate-clutches located between them.

The multiplate-clutches receive the side-gears under an engagement-reactive force to be engaged, with a torque-sensing differential-limiting function to limit the differential motion in the differential mechanism.

The differential casing is provided with actuators on both left and right sides. The respective actuators attract corresponding side-gears via corresponding axles to engage corresponding multiplate-clutches for regulating the differential-limiting function.

SUMMARY OF THE INVENTION

In the differential with a pair of frictional clutches, however, the engaging of one frictional clutch by an actuator works one of the wheels, which enlarges abrasion on the engaged frictional clutch.

Thus, the differential includes two sets of side-gears, multiplate-clutches, and operational actuators to engage the both the multiplate-clutches for prevention of working on one of the wheels.

Thus, the structure itself becomes complicated and expensive as well as becoming larger and heavier, causing disadvantages in vehicle-equippability.

The differential rotations, produced between the differential casing and respective side-gears, are one half as many as the differential rotations produced between the side-gears, while the differential torque becomes twice as large.

The multiplate-clutches require a large clutch capacity with a large applied differential torque. The differential-limiting function on multiplate-clutch is halved.

The invention is directed to a differential having a simple structure, small size, light-weight, and excellent vehicle-equippability. In addition, the differential establishes a sufficient differential-limiting force.

The invention is directed to a differential. The differential includes a differential casing configured to rotatably drive by a motor under a driving force. The differential includes a differential mechanism which includes a pair of first and second side-gears for distributing a torque of the differential casing to first and second output shafts. The differential includes a frictional clutch for interconnecting the first and second output shafts. The frictional clutch includes a first power-transmitting member connected to a first output shaft. The frictional clutch includes a second power-transmitting member connected to a second output shaft. The frictional clutch includes first and second clutch plates axially displacable to engage with each other. A first clutch plate is connected to the first power-transmitting member. A second clutch plate is connected to the second power-transmitting member. The differential includes an actuator for operating the frictional clutch. One output shaft of the first and second output shafts is axially displacable by the actuator under an engagement force to engage the frictional clutch.

Preferably, the frictional clutch includes a lever for interlocking with the one output shaft to axially press the frictional clutch, as the lever multiplies the engagement force of the actuator.

Preferably, the differential includes a cam operable by a torque for engaging the frictional clutch to produce a torque-sensing differential-limiting function.

Preferably, the frictional clutch includes a pressure member positioned abutably against the differential casing. The frictional clutch includes a hole defined by one of first and second power-transmitting members for passing the pressure member through the hole. The one output shaft is displaced for the pressure member to abut against the differential casing and to press against the frictional clutch.

Preferably, the actuator is positioned on the one output shaft outside the differential casing.

Preferably, the frictional clutch is positioned axially on one side relative to the differential mechanism.

Preferably, the differential casing includes an axial side defining an opening. The frictional clutch is positioned proximate to the opening.

Preferably, the frictional clutch includes a first connecting part connecting the first clutch plate and the first power-transmitting member with each other. The frictional clutch includes a second connecting part connecting the first power-transmitting member and the first output shaft with each other. The first and second connecting parts overlap axially with each other.

Preferably, the frictional clutch includes a third connecting part interconnecting the second power-transmitting member and the second output shaft. The first power-transmitting member is connected to a first side-gear. The second power-transmitting member is connected to a second side-gear. The first power-transmitting member is formed with the second connecting part for connecting with the first side-gear. The second power-transmitting member is formed with the third connecting part for connecting with the second side-gear. The first and second power-transmitting members, the first side-gear, and the second and third connecting parts are preliminarily assembled.

According to the first aspect of the invention, the regulating of the engagement force of the frictional clutch by the actuator establishes a constant differential-limiting force (initial torque) or regulates the initial torque, irrelevant to a differential torque applied to the differential mechanism or differential rotational speed produced by the differential mechanism.

The engagement force of frictional clutch is regulated, in response to variations in running conditions, which establishes, for example, a differential-limiting function corresponding to a torque-sensing or speed-sensing differential-limiting function.

The differential employs a set of frictional clutch positioned between both the first and second output shafts (or both the first and second side-gears), which allows for a set of an operational actuator. This allows the differential with a simple structure and lower productive cost, compared to a conventional example with two sets of frictional clutches and actuators. Thus, the differential becomes small-sized and light-weight, which considerably enhances vehicle-equippability.

The differential rotation, which is produced between both the output shafts (or both the side-gears) where the frictional clutch is positioned, is doubled to the differential rotation which is produced between the differential casing and respective side-gears, while the differential torque is halved. Thus, one set of multiplate-clutch establishes differential-limiting function equivalent to the conventional example with two sets of multiplate-clutches.

In addition, the rotation of the first output shaft is transmitted to the first clutch plate through the first power-transmitting member. The rotation of the second output shaft is transmitted to the second clutch plate through the second power-transmitting member. This directly guides the rotational difference between both the output shafts (or both the side-gears) to differential rotation between both clutch plates, without another converting mechanism for converting differential rotation between both the output shafts into differential rotation between both the clutch plates.

This reduces the number of components. The reduction considerably restrains variation of dimensions-accuracy in relation to transmission of differential rotation, delay in response due to assembly-looseness between components relative to transmission of differential rotation, and variation of performance due to inclination of components in relation to transmission of differential rotation.

This improves a vehicle in reliability.

The reduction in the number of components allows for reduction in productive cost.

According to the second aspect, the multiplying function of the lever improves the frictional clutch in capacity and the actuator in engagement-function. This allows them to be small-sized and light-weight, thus improving vehicle-equippability.

According to the third aspect, in addition to the differential-limiting function of the frictional clutch with the actuator, the cam, which receives the torque to be operated, establishes a torque-sensing differential-limiting function. This function reinforces the differential-limiting force during starting or accelerating, which greatly enhances a vehicle in operability and stablability.

The cam includes a cam on a transmission path of torque of the differential mechanism, or respective tooth surfaces of the side-gears and a pinion gear wherein the pinion gear displaces the side-gears toward the frictional clutch under an engagement-thrust force.

According to the fourth aspect, the pressure-force of the actuator against the frictional clutch and the engagement-reactive force of the side-gears are oriented to each other in an identical direction. This prevents interference between the pressure-force and the engagement-reactive force, thus stabilizing differential-limiting function.

According to the fifth aspect, the actuator positioned on the output shaft facilitates maintenance and cooling.

According to the sixth aspect, the frictional clutch, positioned axially on one-side of the differential mechanism, is enhanced in terms of assembly and maintenance. In addition, the clutch allows for a sufficient locating space with a sufficient clutch capacity (differential-limiting force), for example, different from a structure wherein a frictional clutch is positioned inside a set of gears of a differential mechanism.

For example, the frictional clutch of a multiplate-clutch allows necessary sheets of clutch plates to be arranged and to become large-sized, which establish a sufficient differential-limiting force.

The clutch plate with a large size reduces the number of sheets, which allows the frictional clutch and the differential to become axially smaller.

For example, the frictional clutch allows partial uniting (sub-assembly), which greatly enhances in assembly.

According to seventh aspect, the structure with a frictional clutch positioned proximate to the opening is excellent in assembly and maintenance.

According to eighth aspect, the axial overlapping means overlapping of radial projections with each other. The axial overlapping of the first and second connecting parts with each other allows the differential to become axially small-sized, thus enhancing vehicle-equippability.

According to the ninth aspect, the preliminary assembly of the first and second power-transmitting members of the frictional clutch, first side-gear, and second and third connecting parts greatly enhances the differential in terms of assembly and maintenance.

DETAILED DESCRIPTION OF THE PREFERRED EMBODIMENTS

Embodiments of the invention will hereby be described with reference to the drawings.

First Embodiment

With reference to FIGS. 1 to 3, and 6, front differential 1 as a differential according to the first embodiment of the invention is described. The left (L) or right (R) indicates the left (L) or right (R) of a vehicle employing front differential 1 in FIGS. 1 and 2. Members with no reference character are not illustrated.

The vehicle includes a drive train, which includes an engine (motor), a transmission, front differential 1 (a differential that distributes driving force from an engine to left and right front wheels), and the left and right wheels. The engine has a driving force, which is transmitted from the transmission to front differential 1 to be distributed to the left and right wheels.

Figure 1:
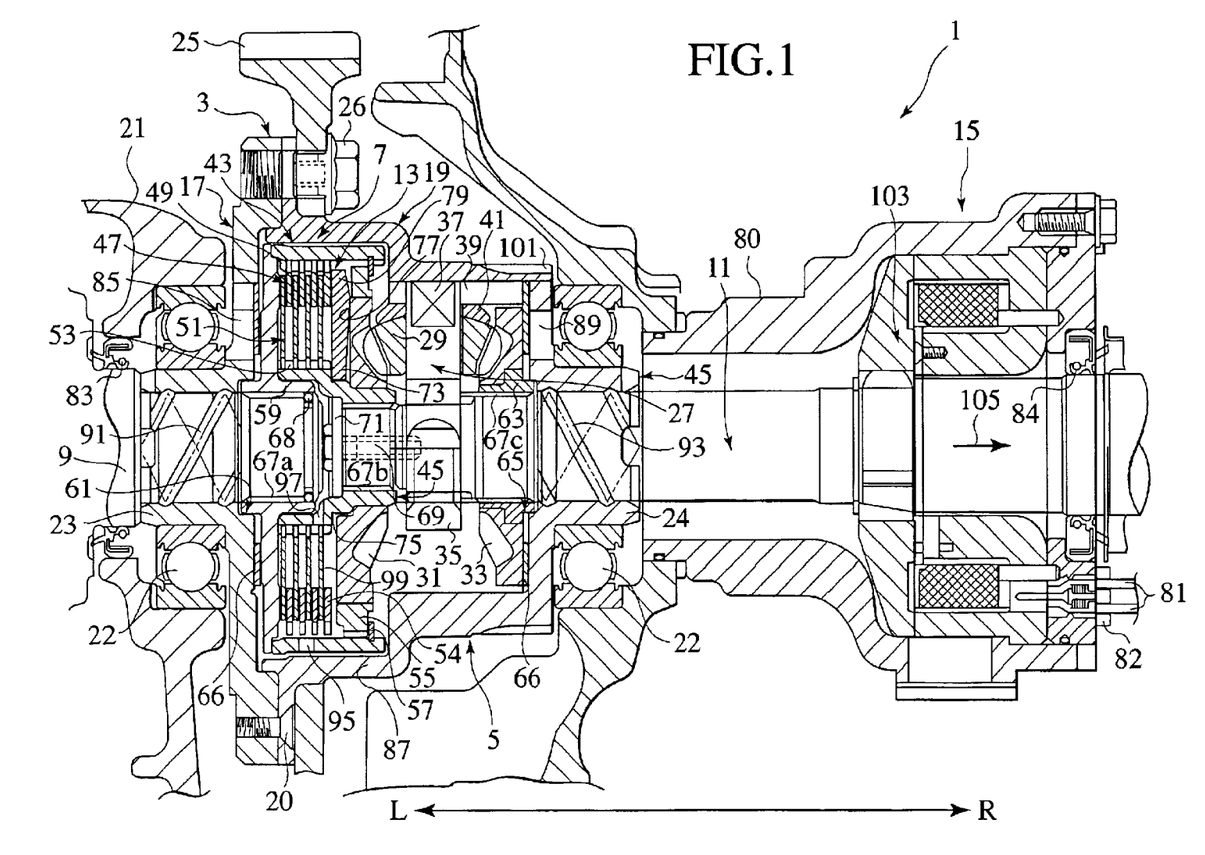
FIG. 1 is a sectional view of a differential according to the first embodiment.

In FIG. 1, front differential 1 includes differential casing 3, bevel-gear type differential mechanism 5, multiplate-clutch 7 or a frictional clutch, left and right front axles 9 and 11, three levers 13, electromagnet 15 or an actuator, and a controller.

Differential casing 3 includes cover 17 and primary casing 19. Cover 17 is secured to primary casing 19 at the left opening, using bolt 20.

Differential casing 3 is located within transmission casing 21. Differential casing 3 includes left and right bosses 23 and 24, which are rotatably supported to casing 21, using bearings 22, respectively. Casing 21 defines an oil reservoir therein.

Differential casing 3 has ring gear 25 secured thereto, using bolt 26. Ring gear 25 engages with an output gear of the transmission. Differential casing 3 is rotatably driven by the engine under a driving force that is transmitted through the transmission.

Differential mechanism 5 includes pinion shafts 27, pinion gears 29 or cams, and output side-gears 31 and 33 or cams.

Each of pinion shafts 27 is arranged radially about hub 35. Pinion shafts 27 have parallel surfaces 37, which are cut out at the ends, respectively. Pinion shafts 27 movably engage with axial grooves 39 defined by primary casing 19 at parallel surfaces 37. Pinion gears 29 are rotatably supported on pinion shafts 27. Pinion gears 29 engage with side-gears 31 and 33 from the left and right.

Primary casing 19 and pinion gears 29 have spherical washers 41 interposed therebetween. Washers 41 receive pinion gears 29 under a centrifugal force. Washers 41 receive pinion gears 29 under an engagement-reactive force that is produced by engaging of washers 41 with side-gears 31, 33.

Multiplate-clutch 7 is interposed between clutch housing 43 (first power transmitting member of a frictional clutch) and clutch hub 45 (second power transmitting member of the frictional clutch). Clutch 7 includes outer plates 47 (first clutch-plate), which connect with spline 49 (first clutch-plate connecting part) defined on the inner periphery of housing 43. Clutch 7 includes inner plates 51 (second clutch-plate), which connect with spline 53 defined on the outer periphery of clutch hub 45. Pressure-ring 54 on the right of multiplate-clutch 7 connects with spline 49.

Left side-gear 31 (first side gear) has a ring 55 welded on the outer periphery. Ring 55 is connected to spline 49 of housing 43, and is prevented from coming-off by snap ring 57. Housing 43 includes hub 59 rotatably supported by supporting portion 61 of cover 17. Right side-gear 33 (second side-gear) includes hub 63 welded on the inner periphery. Hub 63 is rotatably supported by supporting portion 65 of primary casing 19.

Between clutch housing 43 and cover 17, and between right side-gear 33 and primary casing 19, thrust-washers 66 are located, respectively. Washers 66 are subjected to an engagement-reactive force from respective side-gears 31, 33 and an attractive force from electromagnet 15.

Front axles 9 and 11 are connected to the left and right wheels, via couplings and another axles, respectively.

Left axle 9 is connected to spline 67a (first axle-connecting portion) of hub 59 (clutch housing 43) to be connected to left side-gear 31. Axle 9 and clutch housing 43 (hub 59) are positioned by snap ring 68. Right axle 11 is connected to spline 67c of hub 63. Axle 11 is connected to spline 67b (second axle-connecting portion) of clutch hub 45 leftwardly through hub 35. Right axle 11 and clutch hub 45 are integrated with each other, using bolt 69 and flange 71.

Figure 3:
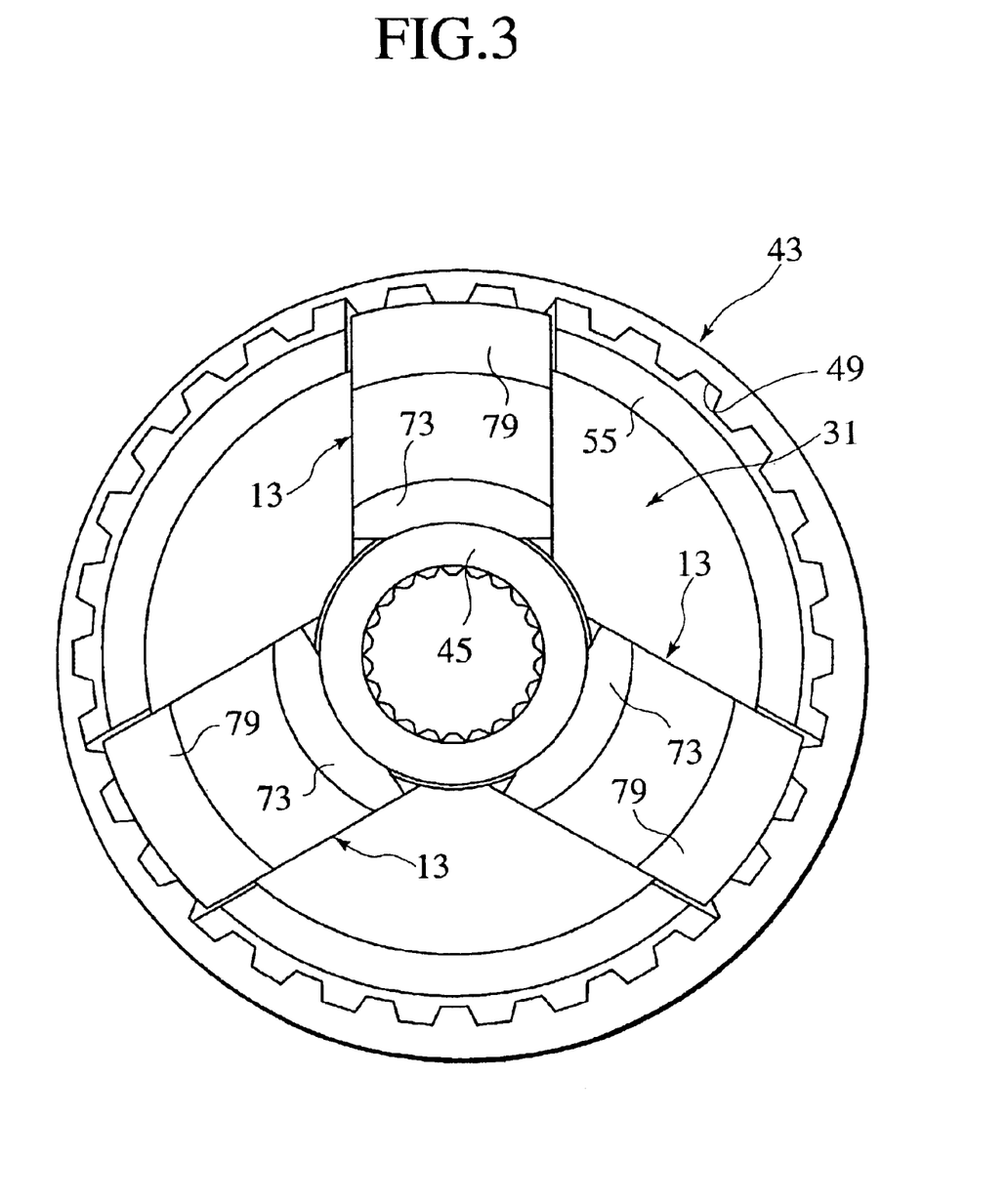
FIG. 3 is a sectional view along the II—II line in FIG. 2.

Respective levers 13 are arranged at an equal angle in a peripheral direction, as shown in FIG. 3. Levers 13 include a power-point 73 engaged with stepped part 75 of clutch hub 45. Lever 13 includes a fulcrum contacting left side-gear 31. Lever 13 includes an application-point 79 opposed to multiplate-clutch 7, with pressure-ring 54 intervening therebetween.

Figure 2:
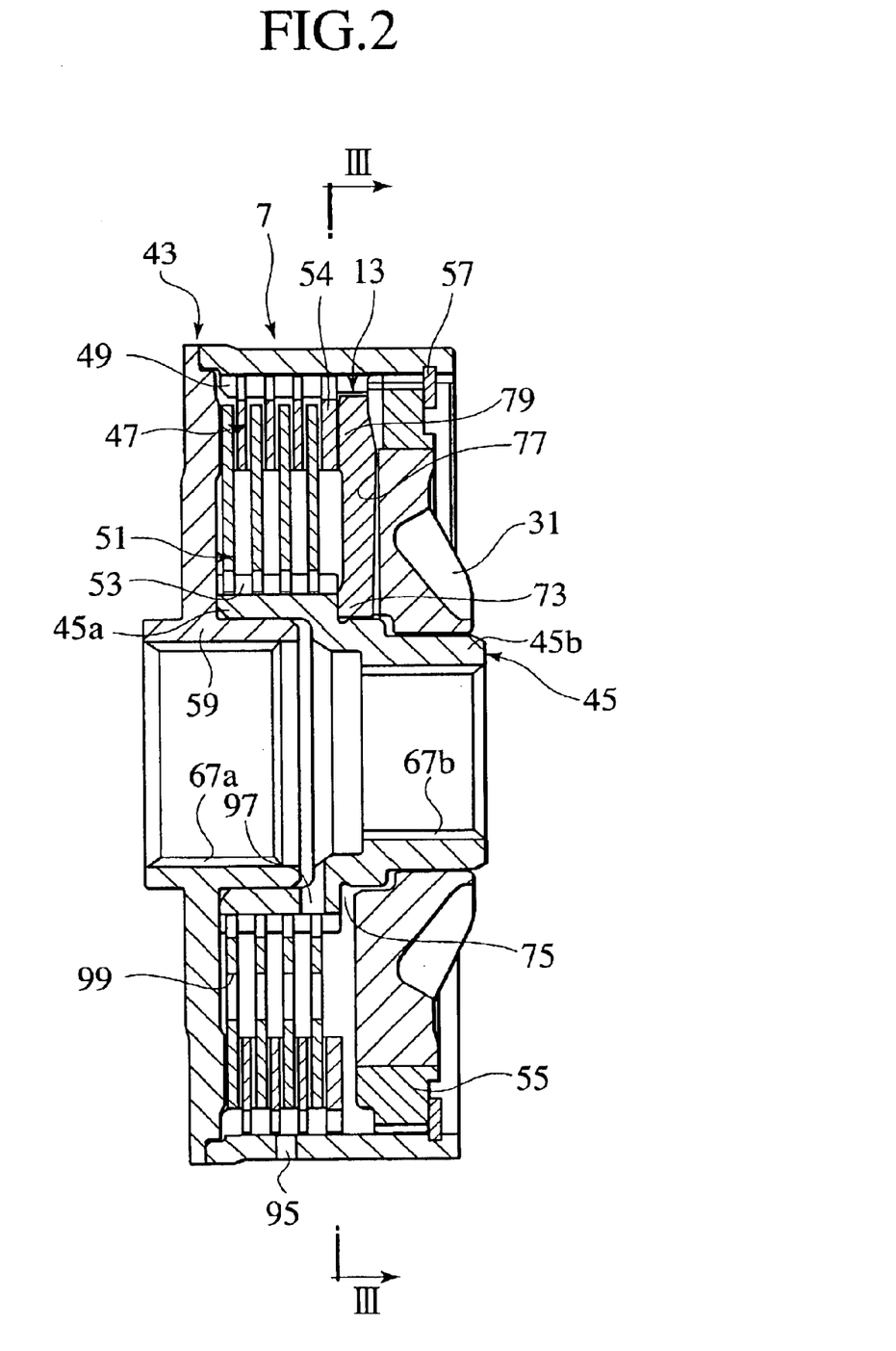
FIG. 2 is a sectional view illustrating a primary part of the differential in FIG. 1.

In FIG. 2, multiplate-clutch 7 (outer plates 47 and inner plates 51), pressure-ring 54, respective levers 13, and left side-gears 31 are preliminarily assembled to clutch housing 43 and clutch hub 45 to be sub-assembled.

Under the sub-assembly, clutch hub 45 has left end 45a rotataby supported on the outer periphery of clutch housing 43. Hub 45 has right end 45b with the outer periphery, which rotatably supports side-gear 31.

In the sub-assembly, outer plates 47, inner plates 51, pressure-ring 54, respective levers 13, and left side-gear 31 are assembled to clutch housing 43 and clutch hub 45. The securing of side-gear 31 with snap ring 57 positions the respective assembled members in an axial direction, via left side-gear 31.

The removal of snap ring 57 allows the removal or exchange of the respective assembled members.

Right thrust-washer 66, right side-gear 33, and pinion gears 29 rotatably supported on pinion shafts 27 are assembled to primary casing 19. The assembling of front differential 1 is such that the sub-assembly is assembled to primary casing 19, with right side-gear 33 engaged with respective pinion gears 29.

Thereafter, clutch hub 45 and right axle 11 are connected, using bolt 69 and flange 71. The inserting of left thrust-washer 66 and the securing of cover 17 and primary casing 19 using bolt 20 completes the assembly of front differential 1.

In the above sub-assembly, splines 49 and 67a are overlapped with each other in an axial direction, with the spline 49 of clutch housing 43 connected to outer plates 47, and with the spline 67a of clutch housing 43 (hub 59) connected to axle 9. The axial projections of respective splines 49 and 67a overlap with each other, which itself allows the structure to be shortened in an axial direction.

Electromagnet 15 is fixed to right axle pipe 80 that is connected to transmission casing 21. Electromagnet 15 includes lead wire 81, which is drawn outside through grommet 82 to be connected to a controller on the vehicle.

Left axle 9 and transmission casing 21 have mechanical seal 83 interposed therebetween. Right axle 11 and axle pipe 80 have mechanical seal 84 interposed therebetween. Seal 84 prevents oil leakage from transmission casing 21 and axle pipe 80, and prevents entrance of foreign materials from the outside.

Differential casing 3 is formed with opening 85, 87, and 89. Bossed parts 23 and 24 have inner peripheries, which define spiral oil channels 91 and 93, respectively. Clutch housing 43 and clutch hub 45 define oil holes 95 and 97 for transmitting an oil to the sliding surfaces between inner and outer plates 47 and 51, respectively. Inner plates 51 define oil holes 99 for accelerating the transmission of the oil, respectively.

Differential casing 3 (primary casing 19) has an outer periphery, which is formed with a pulse gear 101 for a speed meter thereon.

A driving force for rotating differential casing 3 is distributed to left and right side-gears 31 and 33 through pinion shafts 27 and pinion gears 29. The driving force is transmitted from left side-gear 31 and clutch housing 43 to the left wheel through axle 9. The driving force is transmitted from right side-gear 33 to the right wheel through axle 11.

If a difference in driving resistance between the left and right front wheels is produced during running on a bad road, the driving force of the engine is differentially distributed to the respective left and right sides due to the rotation of each pinion gear 29 on the axis.

The engaging portions (respective tooth surfaces) of respective side-gears 31 and, 33 and pinion gear 29 constitute cams. The applying of torque to differential mechanism 5 operates the cams. Right side-gear 33 presses against pinion gears 29, pinion shafts 27, and left side-gear 31 leftwardly under the engagement-reactive force. To a pressure-force, an engagement-reactive force of left side-gear 31 is added. Each of levers 13 receives side-gear 31 under the pressure-force and the reactive force to thus press and engage multiplate-clutch 7 using pressure-ring 54.

Multiplate-clutch 7 is subjected to the engagement-reactive force from side-gears 31 and 33, to be engaged, with the reactive force varying in proportion to torque. Multiplate-clutch 7 produces a torque-sensing differential-limiting function under a frictional resistance during both forward and backward running. The function limits the differential motion of differential mechanism 5.

The torque-sensing differential-limiting function prevents the racing of the front wheels during starting or accelerating, when a large driving torque is applied to a vehicle This stabilizes the vehicle in action, improves the vehicle in operability, runnability, stability, and operability whilst running.

The controller detects turning-run from speed, steering angle or transverse gravity. The controller excites electromagnet 15, controls an exciting current, and stops the exciting current in response to the state of the road surface.

When exciting, electromagnet 15 attracts armature 103 fixed on right axle 11 to draw right axle 11 and clutch hub 45 rightwardly as shown by arrow 105 in FIG. 1.

When clutch hub 45 is attracted rightwardly, each of levers 13 is pressed against power point 73 to swing on fulcrum 77. Under a great pressure-force produced by multiplying of the attractive force, each of fulcrums 77 presses against multiplate-clutch 7 to be engaged, using pressure-ring 54. Snap ring 57 bears a force that is applied to left side-gear 31 from each of fulcrums 77 of levers 13.

The engaging of multiplate-clutch 7 by electromagnet 15 normally under a constant force, allows the controller to establish the initial torque (a constant differential-limiting force) irrelevant to differential torque or differential rotational speed, for example, in accordance with different kinds of vehicles. The controller arbitrarily changes the initial torque in response to running conditions even in an identical kind of vehicle.

The considerable racing of one of the front wheels during starting, accelerating or running on a bad road deteriorates the torque-sensing differential-limiting function. The initial torque prevents deterioratation in startability, acceleratability, and runnablity on a bad road under this condition, which stabilizes a vehicle body in action and remarkably improves operability.

The initial torque produces no delay in the rising-time of a differential-limiting force, different to that is produced by a pre-stressed spring as a general structure under a pressure-force.

The controller controls the exciting current of electromagnet 15 (an attractive force) in response to variations in running conditions, such as the state of a road surface, steering, acceleration, or turning. The control regulates multiplate-clutch 7 in a differential-limiting force, or locks differential mechanism 5 in differential motion.

The differential-limiting function remarkably improves runnability on a bad road, as well as startability, acceleratablity, steerability, and stability.

The controlling of electromagnet 15 in an attractive force allows for an adequate sliding between outer plates 47 and outer plates 51 of multiplate-clutch 7, which regulates the number of differential rotations between the front wheels. This regulation improves the turning and stability of a vehicle body in during turning.

Figure 6:
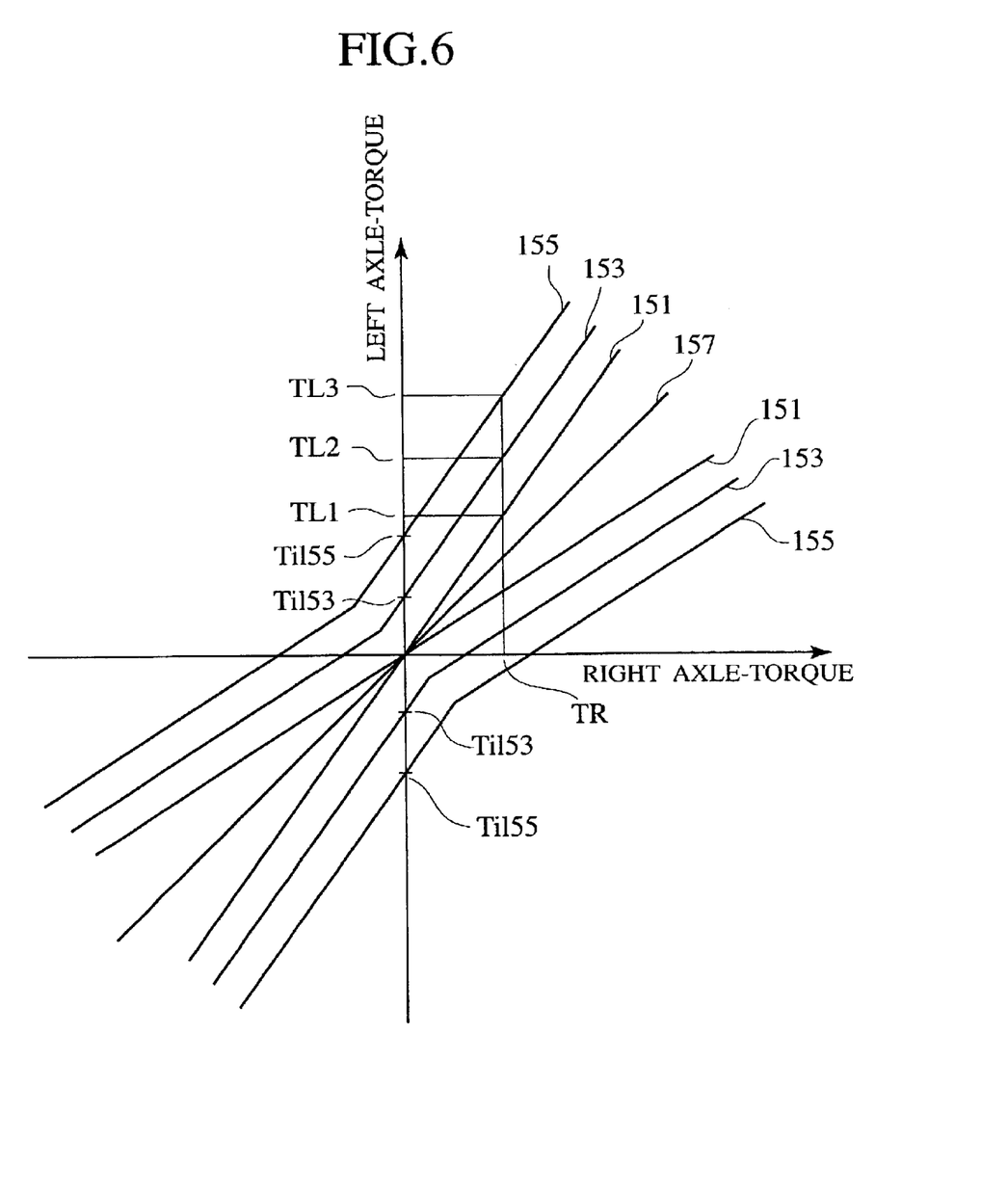
FIG. 6 is a diagram illustrating the torque-bias-ratio of each embodiment.

Graphs 151, 153 and 155 in FIG. 6 illustrate torque-bias-ratio (torque-distributing-property), using multiplate-clutch 7 in front differential 1. The vertical axis indicates the left axle torque with a coordinate. The horizontal axis indicates the right axle torque with a coordinate. The graph 157 with a slope at 45 degrees illustrates the torque-bias-ratio relative to the differential without the differential-limiting function.

Each of graphs 151, 153 and 155 in the upper left region (I, II and III quadrants) relative to graph 157 indicates the magnitude of driving torque (axle torque). The driving torque is transmitted to the left front wheel due to the differential-limiting force of multiplate-clutch 7 during the racing of the right front wheel. Each of graphs 151, 153 and 155 in the lower right region (I, III and IV quadrants) relative to graph 157 indicates the magnitude of driving torque. The driving torque is transmitted to the right front wheel due to the differential-limiting force of multiplate-clutch 7 during the racing of the left front wheel.

Respective graphs 153 and 155 have corresponding intercepts Ti153 and Ti155 on the vertical axis. They indicate initial torques, respectively. Graph 151 indicates a property without establishment of initial torque.

The regulating of multiplate-clutch 7 in a differential-limiting force by electromagnet 15 in front differential 1 establishes various torque-bias-ratios and initial torques.

For example, the racing of the right front wheel lowers the axle torque to TR. In this case, the driving torque to be transmitted to the left front wheel is TL1 on graph 151, TL2 on graph 153, or TL3 on graph 155. Improvments on runnability on a bad road, startablity, acceleratability, operability and stability enhances in the rising order of the graphs.

The preventing effect on deterioration of startablity, acceleratability, or runnability on a bad road by initial torque improves in the order of graphs 153 and 155 with greater initial torques (Ti153, Ti155).

Multiplate-clutch 7 is positioned between clutch housing 43 and clutch hub 45, the clutch housing 43 being connected to left axle 9 (shaft), and the clutch hub 45 being connected to right axle 11 (shaft) (referred to as shaft-shaft (S—S) position). The position allows twice the number of input differential rotations and half the differential torque of a structure or H-S position where a differential casing (H: housing) and a shaft (S) have clutch 7 positioned therebetween.

Multiplate-clutch 7, to which half the differential torque is applied, obtains twice the differential-limiting force at an identical clutch capacity. The differential-limiting force further remarkably improves runnablity on a bad road, as well as startability, acceleratability, operability, and stability.

Front differential 1 with multiplate-clutch 7 in the S—S position has equal torque-bias-ratios during the racing of the left and right wheels. In the upper left region and lower right region of the graph 157, respective angles of graphs 151, 153 and 155 relative to graph 157 are equal to each other. This stabilizes a vehicle body in action during running on a bad road or when starting or accelerating, which further improves runnability, startablity and steerability.

When differential casing 3 rotates, oil is taken up from an oil reservoir to flow in or out of openings 85, 87 and 89 or oil channels 91 and 93 with a screw-pump-function into differential casing 3. The flown-in oil sufficiently lubricates and cools multiplate-clutch 7, respective engaging portions of gears 29, 31 and 33 of differential mechanism 5, the supporting portions of pinion gears 29 on pinion shafts 27, thrust-washers 66, parallel faces 37 of pinion shafts 27, axial grooves 39 of primary casing 19, splines 49 and 53, levers 13, and spherical washers 41, thus improving durability.

Clutch housing 43 and clutch hub 45 have oil holes 95 and 97, through which an oil is transmitted to the sliding surfaces between outer and inner plates 47 and 51. Inner plates 51 have oil holes 99, which facilitate to move oil and thus improve lubricating, cooling effects and durability.

As described above, front differential 1 is structured.

According to front differential 1, as described above, the regulating of multiplate-clutch 7 in engagement force by electromagnet 15 allows the initial torque to be established or regulated.

The regulating of multiplate-clutch 7 in engagement force in response to variations in running conditions establishes the differential-limiting function corresponding to a torque-sensing or speed-sensing differential-limiting function.

Front differential 1 with multiplate-clutch 7 positioned between both axles 9 and 11 (side-gears 31 and 33) allows for only one set of electromagnet 15 as an actuator. This allows a simpler structure with lower productive cost, compared to two sets of mutliplate-clutches and actuators. In addition, this allows for a small-size and light-weight, which considerably enhances vehicle-equippability.

The differential torque, which is applied to multiplate-clutch 7 positioned between both axles 9 and 11, is halved, when compared to the conventional example where frictional clutches are positioned between a differential casing and respective side-gears. Thus, one set of multiplate-clutch 7 establishes differential-limiting function equivalent to the conventional example with two sets of multiplate-clutches.

Levers 13 with a multiplying function improves multiplate-clutch 7 in clutch-capacity and electromagnet 15 in engaging function. These allow multiplate-clutch 7 and electromagnet 15 to be of smaller size and lighter weight, thus improving vehicle-equippability.

In addition to the differential-limiting function of multiplate-clutch 7 with electromagnet 15, the engagement-reactive force between side-gears 31 and 33 establishes the torque-sensing differential-limiting function. This reinforces the a differential-limiting force during starting or accelerating when large driving force is applied, which further improves a vehicle in operability and stability.

The use of the engagement-reactive force between side-gears 31 and 33 necessitates no cam on a torque-transmitting path of differential mechanism 5, which reduces practical costs.

The positioning of electromagnet 15 on axle 11 facilitates maintenance and improves the cooling effect.

Multiplate-clutch 7, positioned axially to differential mechanism 5, is easy to assemble and maintain. In addition, clutch 7 obtains sufficient locating space, for example, different from the structure wherein a multiplate-clutch is positioned inside a set of gears constituting differential mechanism 5. This locating space allows the employing of necessary pieces of large-sized outer plates 47 and inner plates 51 to thus establish a sufficient differential-limiting force.

The large-sized outer and inner plates 47 and 51 reduce the number of pieces. This allows multiplate-clutch 7 and front differential 1 to be small-sized in an axial direction.

The positioning of multiplate-clutch 7 close to the opening of differential casing 3 (primary casing 19) enhances assembly and maintenance.

The overlapping of splines 49 and 67a of clutch housing 43 with each other in an axial direction allows front differential 1 to be small-sized in the axial direction, thus improving vehicle-equippability.

The uniting (sub-assembling) of multiplate-clutch 7 (outer plates 47 and inner plates 51), left side-gear 31, and levers 13 on clutch housing 43 and clutch hub 45 remarkably improves their assembly and maintenance.

The removal of snap ring 57 allows outer plates 47, inner plates 51, pressure-ring 54, respective levers 13, and left side-gear 31 to be removed from the sub-assembly. The removal allows for easy maintenance and exchange of parts.

Second Embodiment

Front differential 201 according to the second embodiment of the invention is described with reference to FIGS. 4 and 6.

Front differential 201 replaces front differential 1 in the vehicle that employs front differential 1 of the first embodiment. The left (L) or right (R) direction indicates the left or right direction in the vehicle and FIG. 4. Members with no reference character are not illustrated.

Hereinafter, members are given the reference characters to be cited, which are operationally identical to those of front differential 1, and the differences are described.

Front differential 201 includes differential casing 3, bevel-type differential mechanism 5, multiplate-clutch 7, left and right axles 9 and 11, pressure-pins 203, pressure-receiving ring 205, electromagnet 15, and a controller. Each of pressure-pins 203 corresponds to a pressure-member located abutably against the differential casing 3.

Left side-gear 31 is welded to clutch housing 43. The welding is performed after the assembling of clutch housing 43 of multiplate-clutch 7 with clutch hub 45, outer plates 47 and inner plates 51.

Clutch housing 43 is formed with oil-holes 207, and oil-hole 209 opposite to opening 85 of differential casing 3. Holes 207 and 209 have an oil to be transmitted therethrough to the sliding surfaces between outer and inner plates 47 and 51, which improves lubrication, cooling effects and durability.

Respective pressure-pins 203 are arranged at an equal angle in a peripheral direction. Pins 203 pass through through-holes 211 (through-hole that pressure-member passes through) formed to clutch housing 43. Each of pressure-pins 203 engages with engagement-hole 213 formed with pressure-receiving ring 205. Rings 205 are integrally rotatably connected to clutch housing 43, using respective pressure-pins 203.

Between pressure-receiving ring 205 and differential casing 3 (cover 17), thrust-washers 215 are positioned to slide on rings 205. Thrust-washers 215 have arms 217 engaged with openings 85 for the stopping of the rotation relative to differential casing 3.

Left axle 9 is integrated with clutch housing 43, using bolt 69 and flange 71. Left axle 9 has armature 103 secured thereon.

Electromagnet 15 is fixed to the left axle connected to transmission casing 21. Electromagnet 15 includes lead-wire 81, which is drawn outside through grommet 82 to be connected to the controller on a vehicle.

The controller detects turning-run from speed, steering angle or transverse gravity. The controller excites electromagnet 15, controls an exciting current, and stops the exciting current in response to the state of surface of a road.

Figure 4:
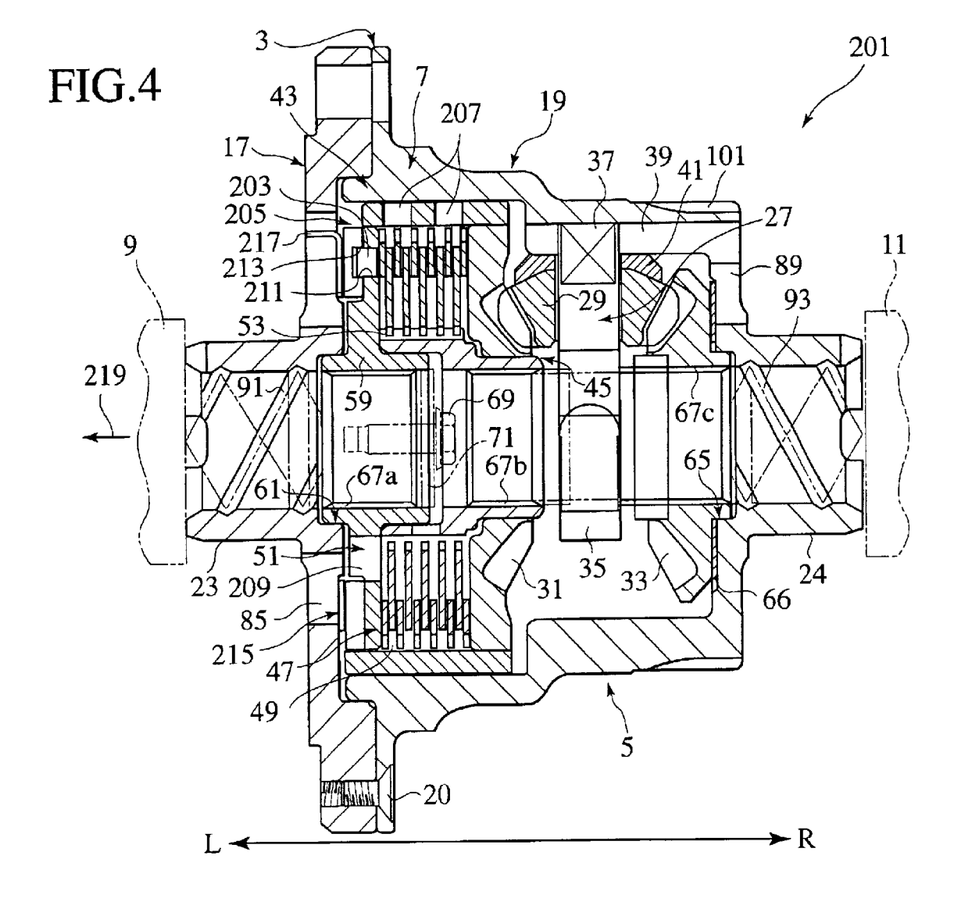
FIG. 4 is a sectional view of a differential according to the second embodiment.

When exciting, electromagnet 15 attracts armature 103 to draw left axle 9, clutch housing 43, and left side-gear 31 leftwardly as shown by arrow 219 in FIG. 4.

When left side-gear 31 is attracted leftwardly, multiplate-clutch 7 is displaced leftwardly. Clutch 7 is pressed and engaged between left side-gear 31 and pressure-pins 103.

Similarly to front differential 1, side-gears 31 and 33 engage the multiplate-clutch under an engagement-reactive force. A torque-sensing type differential-limiting function is produced to limit the differential motion of differential mechanism 5.

The controller establishes initial torque of multiplate-clutch 7 in accordance with the different kinds of vehicles. The controller arbitrarily changes the initial torque in response to running conditions even in an identical kind of vehicle.

The controller regulates multiplate-clutch 7 in a differential-limiting force in response to variations in running conditions. The controller locks the differential motion of differential mechanism 5 to establish torque-bias-ratios, as shown by graphs 151, 153 and 155 in FIG. 6.

As described above, front differential 201 is structured.

Front differential 201 achieves benefits equivalent to those of front differential 1 of the first embodiment, except for the multiplying function of levers 13.

In addition, front differential 1 has mulitplate-clutch 7, which is displaced to press against pressure-pins 203. The operating force (attractive force) of electromagnet 15 to multiplate-clutch 7 and the engagement-reactive force of left side-gear 31 exert in an identical direction. This prevents interference of the attractive force and the reactive force with each other, thus achieving a stable differential-limiting function.

Third Embodiment

Figure 5:
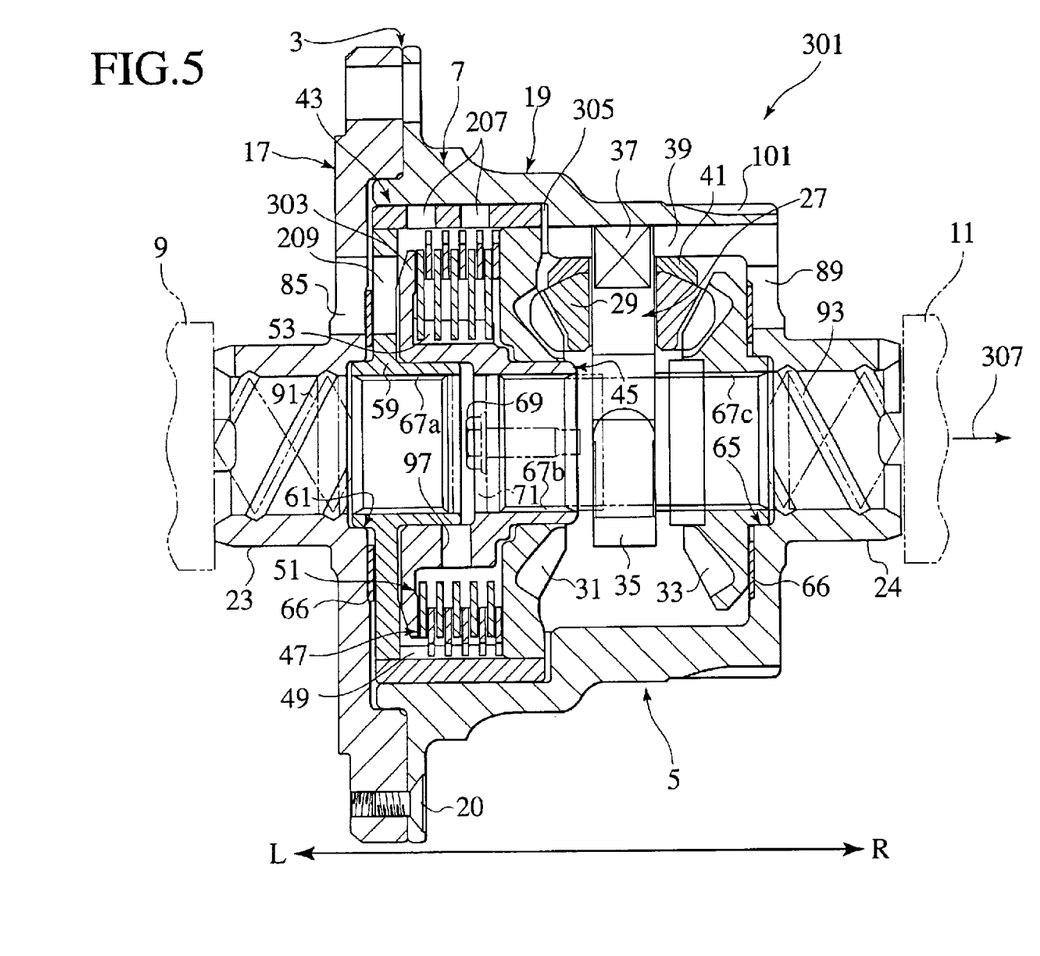
FIG. 5 is a sectional view of a differential according to the third embodiment.

With reference to FIGS. 5 and 6, front differential 301 according to the third embodiment of the invention is described.

Front differential 301 replaces front differential 1, or 201 in the vehicle of the first or second embodiment. The left (L) or right (R) direction indicates the left or right direction of the vehicle and in FIG. 5. Members with no reference character are not illustrated.

Hereinafter, members are given the reference characters to be cited, which are operationally identical to those of front differential 1 or 201, and the differences are described.

Front differential 301 includes differential casing 3, bevel-gear type differential mechanism 5, multiplate-clutch 7, left and right axles 9 and 11, electromagnet 15, and a controller.

Similarly to front differential 1, electromagnet 15 is fixed to right axle pipe 80. Right axle 11 is integrated with clutch hub 45, using bolt 69 and flange 71.

Clutch hub 45 includes pressure-plate 303 against multiplate-clutch 7. Between left side-gear 31, clutch housing 43, and primary casing 19, thrust-washer 305 is positioned to receive pressure-force.

When exciting, electromagnet 15 attracts armature 103 on axle 11. As indicated by the arrow 307 in FIG. 5, axle 11 and clutch hub 45 (pressure-plate 303) are attracted rightwardly. Multiplate-clutch 7 is pressed and engaged between pressure-plate 303 and left side-gear 31.

During the attraction of armature 103 by electromagnet 15, the engagement-reactive force of side-gears 31 and 33 establishes a torque-sensing differential-limiting function.

The initial torque of multiplate-clutch 7 is established in every different kind of vehicle. The initial torque arbitrarily changes initial torque in correspondence with running conditions, even in an identical kind of a vehicle.

The regulating of multiplate-clutch 7 in a differential-limiting force in response to running conditions or the locking of differential mechanism 5 under differential motion, establishes the torque-bias-ratios as shown by graphs 151 and 153 in FIG. 6. This establishment improves runnability on a bad road, as well as startability, acceleratability, operability, turnability and stability of a vehicle body during turning.

As described above, front differential 301 is structured.

Front differential 301 achieves benefits equivalent to those of front differential 1 of the first embodiment, except for the multiplying function of levers 13.

The differential may employ, for example, an actuator with use of an electrically powered motor, or a hydro pneumatic actuator such as a hydraulic actuator, without being limited to an electromagnet.

The frictional clutch may employ, for example, a single-plate clutch or cone-clutch, without being limited to a multilplate-clutch.

The differential mechanism may adopt a planetary-gear type differential mechanism, a differential mechanism where pinion gears, rotatably housed in housing holes of a differential casing, connects with an output side-gear, or a differential mechanism with use of a worm gear, without being limited to bevel-gear type.

The differential may be adapted to a rear differential (the differential distributing a driving force from an engine to the left and right rear wheels), a center differential (the differential distributing a driving force from an engine to the front and rear wheels), as well as a front differential (the differential distributing a driving force from an engine to the left and right front wheels).

The entire contents of Japanese Patent Applications P2002-141342 (filed on May 16, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A differential comprising:
    a differential casing configured to be rotatably driven by a motor under a driving force;
    a differential mechanism comprising a pair of first and second side-gears for distributing a torque of the differential casing to first and second output shafts;
    a frictional clutch for interconnecting the first and second output shafts, the frictional clutch comprising,
        a first power-transmitting member connected to a first output shaft;
        a second power-transmitting member connected to a second output shaft;
        first and second clutch plates axially displacable to engage with each other, a first clutch plate being connected to the first power-transmitting member, and a second clutch plate being connected to the second power-transmitting member; and
    an actuator for operating the frictional clutch,
    wherein the first side-gear and the first output shaft connect to each other using the first power-transmitting member,
    wherein the second side-gear connects directly to the second output shaft, wherein the second power-transmitting member and the second side-gear connect to each other through the second output shaft, and wherein one output shaft of the first and second output shafts is axially displaceable by the actuator under an engagement force to engage the frictional clutch.

2. The differential according to claim 1, wherein the frictional clutch comprises a lever for interlocking with the one output shaft to axially press the frictional clutch, as the lever multiplies the engagement force of the actuator.

3. The differential according to claim 1, further comprising:

a cam operable by a torque for engaging the frictional clutch to produce torque-sensing differential-limiting function.

4. The differential according to claim 1, wherein the frictional clutch comprises,
   a pressure member positioned abutably against the differential casing; and
   a hole defined by one of first and second power-transmitting members for passing the pressure member through the hole, wherein the one output shaft is displaced for the pressure member to abut against the differential casing and to press against the frictional clutch.

5. The differential according to claim 1, wherein the frictional clutch comprises, a first connecting part interconnecting the first clutch plate and the firs power-transmitting member; and a second connecting part interconnecting the first power-transmitting member and the first output shaft, wherein the first and second connecting parts overlap axially with each other.

6. The differential according to claim 1, wherein the actuator is positioned on the one output shaft outside the differential casing.

7. The differential according to claim 6, wherein the frictional clutch is positioned axially on one side relative to the differential mechanism.

8. The differential according to claim 7, wherein the differential casing includes an axial side defining an opening, and wherein the frictional clutch is positioned proximate to the opening.

* * * * *